United States Patent
Hwang et al.

(10) Patent No.: US 8,585,530 B2
(45) Date of Patent: *Nov. 19, 2013

(54) INDEPENDENTLY CONTROLLABLE TRANSMISSION MECHANISM

(75) Inventors: Guan-Shyong Hwang, Chiayi County (TW); Der-Min Tsay, Kaohsiung (TW)

(73) Assignee: National Sun Yat-Sen University of Kaohsiung, Kaohsiung (TW)

( * ) Notice: Subject to any disclaimer, the term of this patent is extended or adjusted under 35 U.S.C. 154(b) by 1120 days.

This patent is subject to a terminal disclaimer.

(21) Appl. No.: 12/547,669

(22) Filed: Aug. 26, 2009

(65) Prior Publication Data

US 2011/0053722 A1      Mar. 3, 2011

(51) Int. Cl.
*F16H 37/02*      (2006.01)

(52) U.S. Cl.
USPC ........... 475/219; 475/207; 475/209; 475/218; 475/329; 475/330

(58) Field of Classification Search
USPC .............. 475/1, 207–209, 218, 219, 329, 330
See application file for complete search history.

(56) References Cited

U.S. PATENT DOCUMENTS

| | | | | |
|---|---|---|---|---|
| 3,046,814 A | * | 7/1962 | Soehrman | 475/211 |
| 4,191,070 A | * | 3/1980 | McKinniss | 475/302 |
| 4,936,165 A | * | 6/1990 | Doyle et al. | 475/72 |
| 6,387,004 B1 | | 5/2002 | Parrish | |
| 2007/0173366 A1 | * | 7/2007 | Goma Ayats | 475/207 |
| 2011/0111904 A1 | * | 5/2011 | Hwang et al. | 475/1 |
| 2012/0021865 A1 | * | 1/2012 | Hwang et al. | 475/330 |
| 2012/0021866 A1 | * | 1/2012 | Hwang et al. | 475/330 |

FOREIGN PATENT DOCUMENTS

TW      242521      11/2005

* cited by examiner

*Primary Examiner* — Derek D Knight
(74) *Attorney, Agent, or Firm* — Alan Kamrath; Kamrath IP Lawfirm, P.A.

(57) ABSTRACT

An independently controllable transmission mechanism includes a first planetary gear set, a second planetary gear set, a first transmission-connecting set and a second transmission-connecting set. The first planetary gear set includes a first power output end, the second planetary gear set includes a transmission control end, the first transmission-connecting set includes a first power input end and the second transmission-connecting set includes a free transmission end. The transmission control end controls the free transmission end to function as a second power input end or a second power output end.

20 Claims, 16 Drawing Sheets

(A)

(B)

(C)

INDEPENDENTLY CONTROLLABLE TRANSMISSION MECHANISM

BACKGROUND OF THE INVENTION

1. Field of the Invention

The present invention relates to an independently controllable transmission mechanism. More particularly, the present invention relates to the independently controllable transmission mechanism utilizing two planetary gear sets and two transmission-connecting sets for variably controlling the power input and for variably controlling the power output.

2. Description of the Related Art

Taiwanese Patent Pub. No. I242521 discloses a conventional gearbox structure for vehicles, including a main shaft on which to provide a slide. A forward gear and a drive gear are arranged at each side of the slide. A transmission shaft is provided with a reverse slide and a combination of a backward bevel gear and a forward bevel gear adjacent to the reverse slide. A final gear shaft is arranged between the backward bevel gear and the forward bevel gear. The forward gear and the drive gear are also arranged between the backward bevel gear and the forward bevel gear such that a width of the gearbox can be significantly reduced. Furthermore, the backward bevel gear and the forward bevel gear are used to engage with a transmission bevel gear provided on the final gear shaft so as to minimize the size of the gearbox. With regard to the problematic aspects naturally occurring during use of the gearbox system, the transmission in the gearbox system is susceptible to inefficiency due to frictional slide movements of the slide in the gearbox.

U.S. Patent No. 6,387,004, entitled "Continuously Variable Transmission," discloses a continuously variable transmission system, including a first planetary gear set and a second planetary gear set. The first planetary gear set and the second planetary gear set correspondingly transmit powers generated from a first motor and a second motor to a transmission shaft. However, the primary problem with such a transmission system is the powers generated from the first motor and the second motor must be constantly transmitted to the single transmission shaft via the first planetary gear set and the second planetary gear set. In this manner, the transmission shaft is fixedly designated as a single power input end while the first motor and the second motor are designated as two power input ends. The transmission system, however, cannot function to variably control the power output. Hence, there is a need of providing an independently controllable transmission mechanism for variably controlling the power input and for variably controlling the power output.

As is described in greater detail below, the present invention provides an independently controllable transmission mechanism utilizing two planetary gear sets and two transmission-connecting sets for variably controlling the power input and for variably controlling the power output. The transmission mechanism includes a transmission control end and a free transmission end functioning as a power input end or a power output end by the transmission control end. The transmission mechanism is capable of shifting the free transmission end between the power input end and the power output end for independently controlling the power transmission. The transmission mechanism of the present invention can avoid using any frictionally sliding member so as to achieve increasing efficiency of power transmission.

SUMMARY OF THE INVENTION

The primary objective of this invention is to provide an independently controllable transmission mechanism, with two planetary gear sets and two transmission-connecting sets utilized to variably control power input and to variably control power output. The transmission mechanism includes a transmission control end and a free transmission end functioning as a power input end or a power output end by the transmission control end. The transmission mechanism shifts the free transmission end between the power input end and the power output end for independently controlling the power transmission. Accordingly, independently controlling the power transmission of the transmission mechanism can be successfully achieved.

Another objective of this invention is to provide an independently controllable transmission mechanism, with two planetary gear sets and two transmission-connecting sets utilized to variably control power input and to variably control power output. No frictionally sliding member is utilized in the transmission mechanism. Accordingly, the efficiency of the power transmission of the present invention can be successfully increased.

The independently controllable transmission mechanism in accordance with an aspect of the present invention includes a first planetary gear set, a second planetary gear set, a first transmission-connecting set and a second transmission-connecting set. The first planetary gear set includes a first power output end, the second planetary gear set includes a transmission control end, the first transmission-connecting set includes a first power input end and the second transmission-connecting set includes a free transmission end. The transmission control end controls the free transmission end to function as a second power input end or a second power output end (i.e. to controllably shift the free transmission end as the second power input end or the second power output end).

In a separate aspect of the present invention, the first planetary gear set includes a first rotational axle, a second rotational axle and a third rotational axle.

In a further separate aspect of the present invention, the first rotational axle of the first planetary gear set performs as the first power output end.

In yet a further separate aspect of the present invention, the second rotational axle of the first planetary gear set is connected with the first transmission-connecting set.

In yet a further separate aspect of the present invention, the third rotational axle of the first planetary gear set is connected with the second transmission-connecting set.

In yet a further separate aspect of the present invention, the first planetary gear set has a positive speed ratio.

In yet a further separate aspect of the present invention, the second planetary gear set includes a first rotational axle, a second rotational axle and a third rotational axle.

In yet a further separate aspect of the present invention, the first rotational axle of the second planetary gear set performs as the transmission control end.

In yet a further separate aspect of the present invention, the second rotational axle of the second planetary gear set is connected with the first transmission-connecting set.

In yet a further separate aspect of the present invention, the third rotational axle of the second planetary gear set is connected with the second transmission-connecting set.

In yet a further separate aspect of the present invention, the second planetary gear set has a negative speed ratio.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that an independently controllable transmission mechanism in accordance with the preferred embodiment of the present invention can be a wide variety of transmission-related mechanisms applicable to transmission gearboxes of ocean power generators (e.g., tidal power generator, wave power generator or ocean current power generator), wind power generators or hybrid vehicles, which are not limitative of the present invention.

Figure 1:
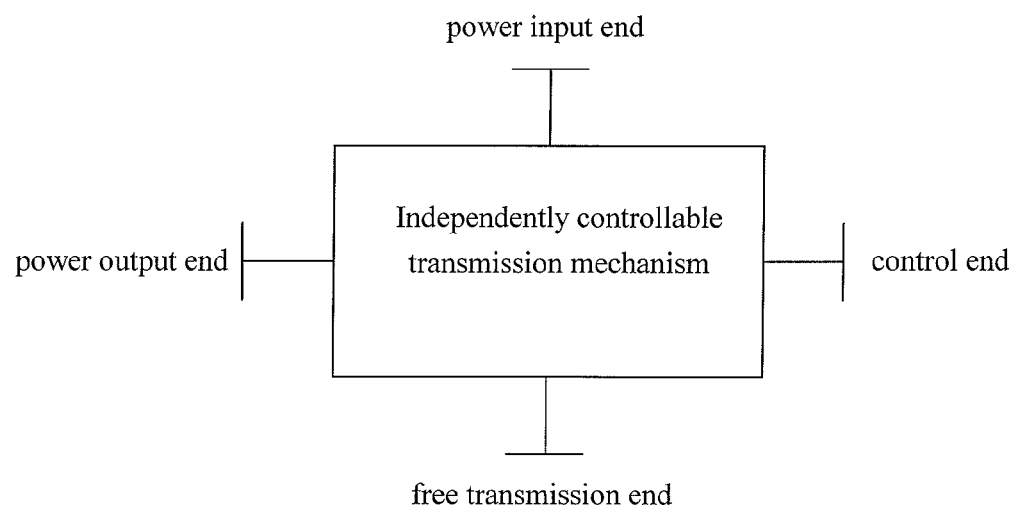
FIG. 1 is a schematic view of an independently controllable transmission mechanism in accordance with a preferred embodiment of the present invention.
Figure 2:
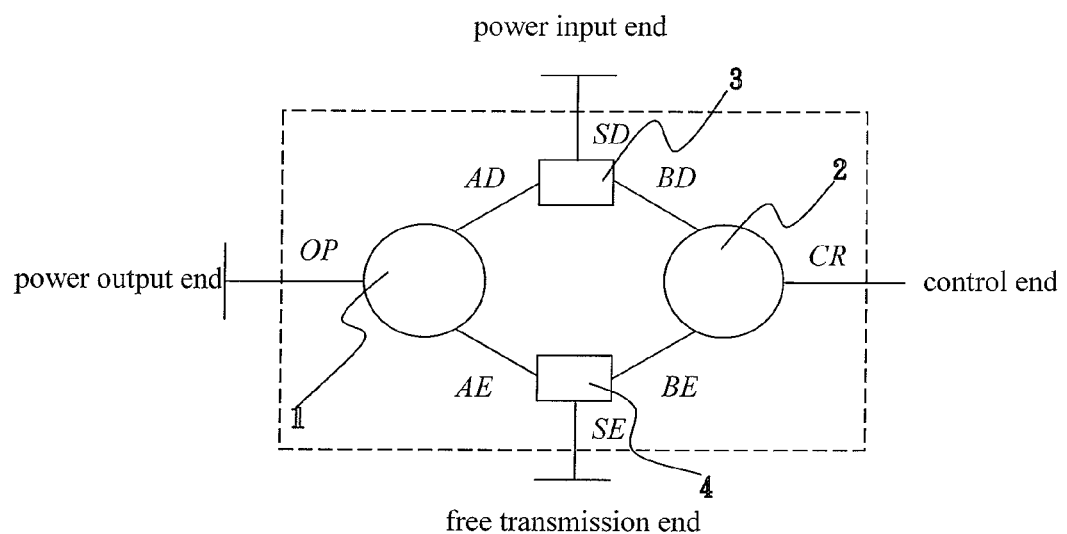
FIG. 2 is an internal schematic view of the independently controllable transmission mechanism, depicted in FIG. 1, in accordance with the preferred embodiment of the present invention.

FIG. 1 illustrates an independently controllable transmission mechanism in accordance with a preferred embodiment of the present invention, FIG. 2 is an internal schematic view of the independently controllable transmission mechanism, depicted in FIG. 1, in accordance with the preferred embodiment of the present invention. Referring to FIGS. 1 and 2, the independently controllable transmission mechanism includes a first planetary gear set 1, a second planetary gear set 2, a first transmission-connecting set 3 and a second transmission-connecting set 4.

Still referring to FIG. 2, the first planetary gear set 1 has a first rotational axle identified as OP, a second rotational axle identified as AD and a third rotational axle identified as AE. The first rotational axle OP performs as a first power output end of the transmission mechanism. The second rotational axle AD is connected with the first transmission-connecting set 3, while the third rotational axle AE is connected with the second transmission-connecting set 4. Correspondingly, the second planetary gear set 2 includes a first rotational axle identified as CR, a second rotational axle identified as BD and a third rotational axle identified as BE. The first rotational axle CR performs as a transmission control end of the transmission mechanism. The second rotational axle BD is connected with the first transmission-connecting set 3 while the third rotational axle BE is connected with the second transmission-connecting set 4.

With continued reference to FIG. 2, the first transmission-connecting set 3 includes a first power input end (identified as SD) to perform as a power input end of the transmission mechanism, and the second transmission-connecting set 4 includes a free transmission end (identified as SE) to perform as an alternative power input/output end of the transmission mechanism.

Referring again to FIGS. 1 and 2, the transmission control end of the transmission mechanism (i.e. first rotational axle CR) is used to control the free transmission end SE of the second transmission-connecting set 4 to function as a second power input end or a second power output end (i.e. to controllably shift the free transmission end SE as the second power input end or the second power output end). When the free transmission end SE functions as a second power input end, the first power input end SD of the first transmission-connecting set 3 and the free transmission end SE of the second transmission-connecting set 4 are capable of synchronously inputting power from different sources. Conversely, When the free transmission end SE functions as a second power output end, the first power output end of the first planetary gear set 1 (i.e. first rotational axle OP) and the free transmission end SE of the second transmission-connecting set 4 are capable of synchronously outputting power from the transmission mechanism.

Figure 3:
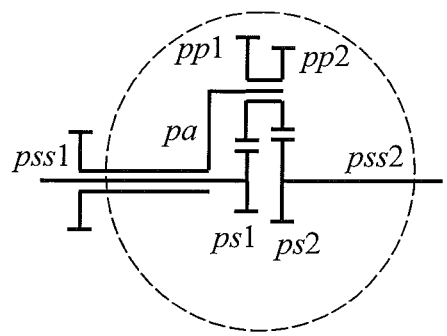
FIGS. 3A through 3C are similar internal schematic views of planetary gear sets applied in the independently controllable transmission mechanism in accordance with the preferred embodiment of the present invention.
Figure 3:
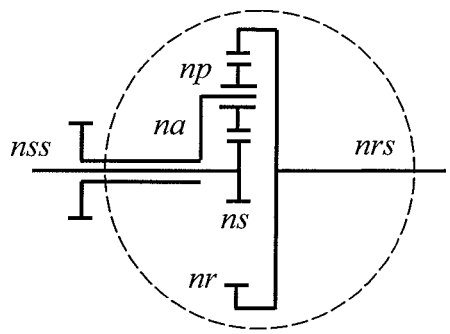
Figure 3:
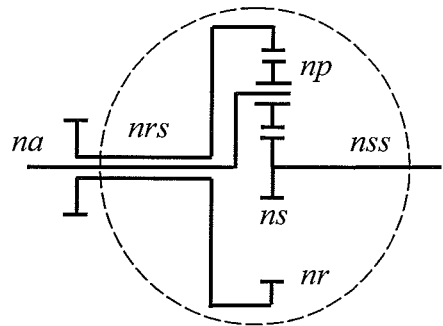
Figure 4:
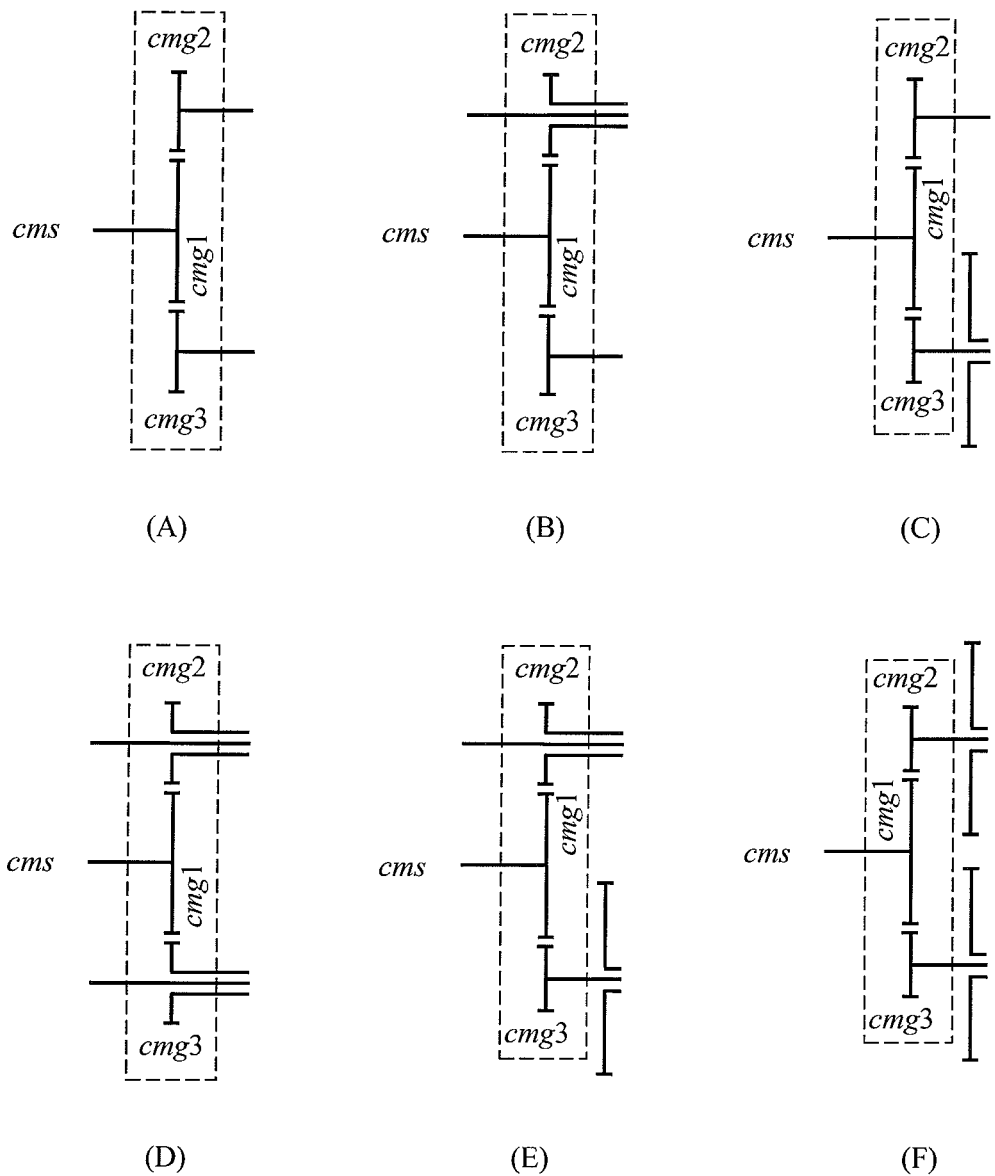
FIGS. 4A through 4F are similar internal schematic views of transmission-connecting sets applied in the independently controllable transmission mechanism in accordance with the preferred embodiment of the present invention.
Figure 5:
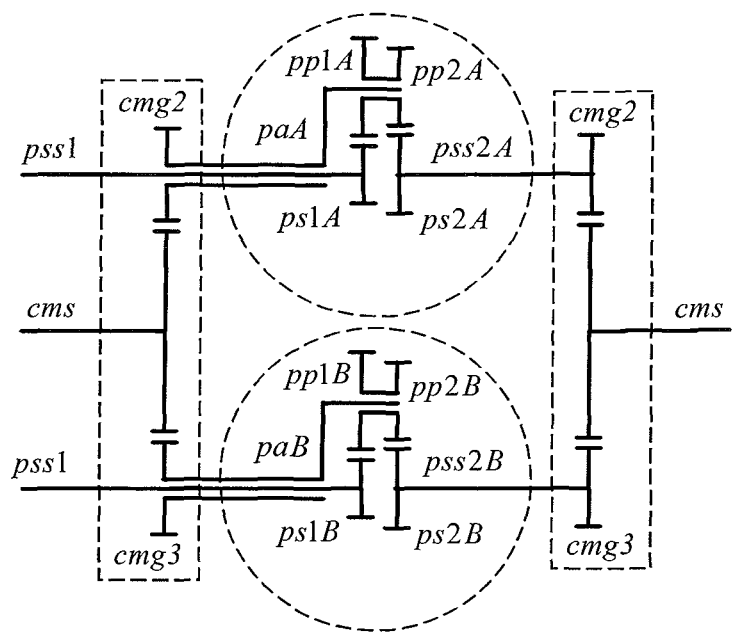
FIGS. 5 through 27 are similar internal schematic views of several combinations of two planetary gear sets and two transmission-connecting sets formed in the independently controllable transmission mechanism in accordance with a first through twenty-third embodiments of the present invention.
Figure 6:
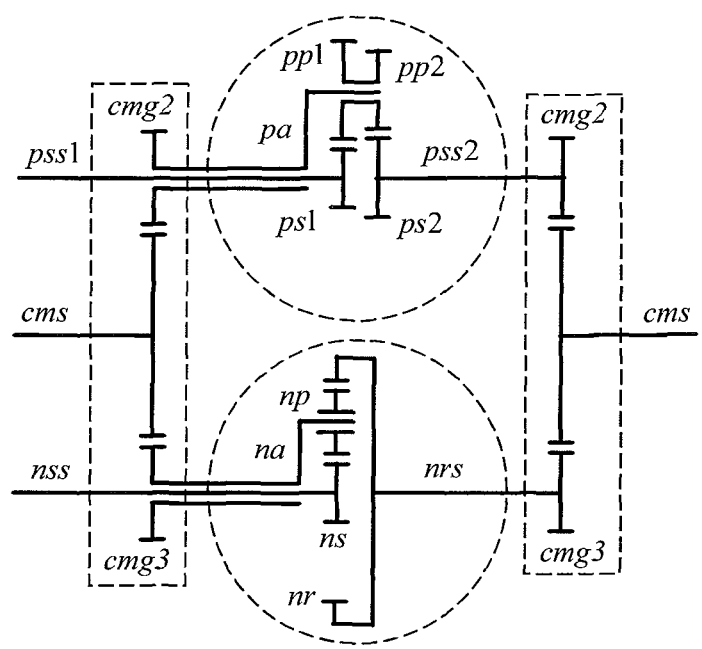
Figure 7:
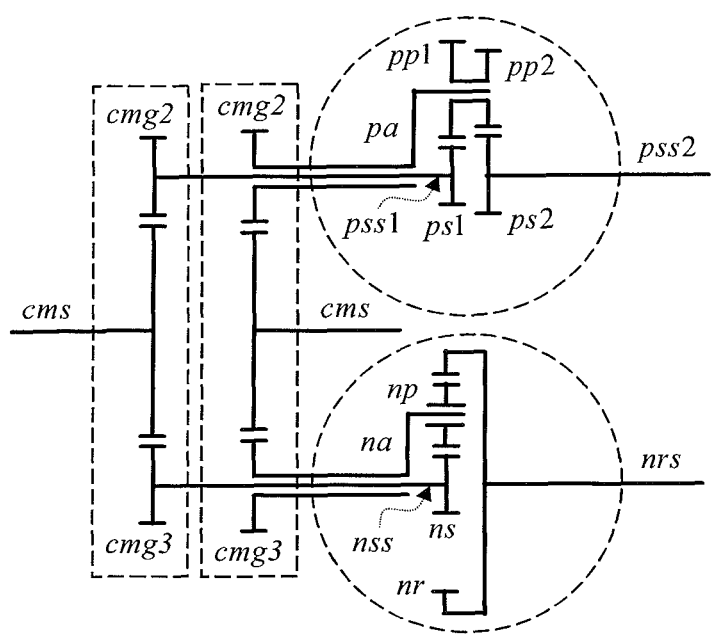
Figure 8:
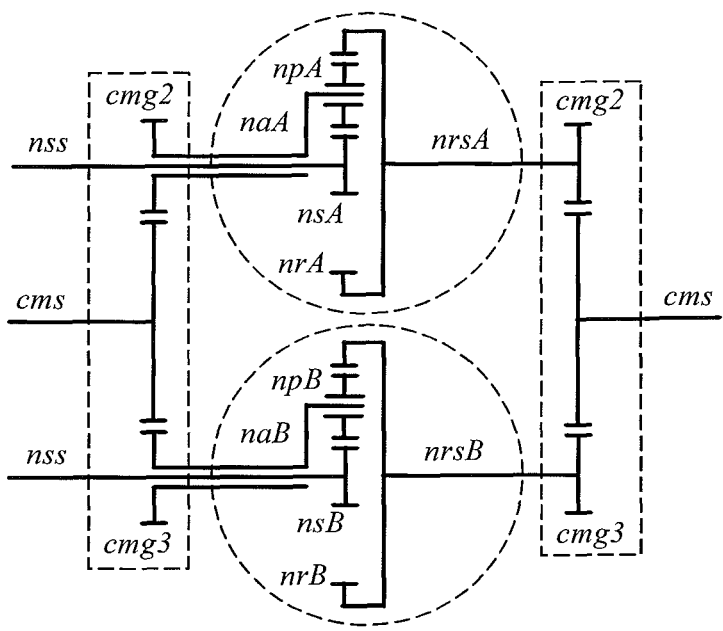
Figure 9:
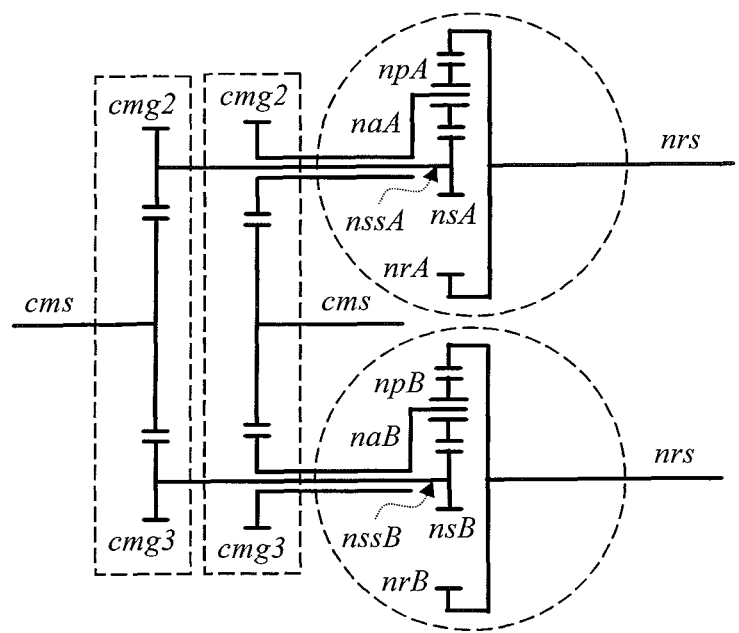
Figure 10:
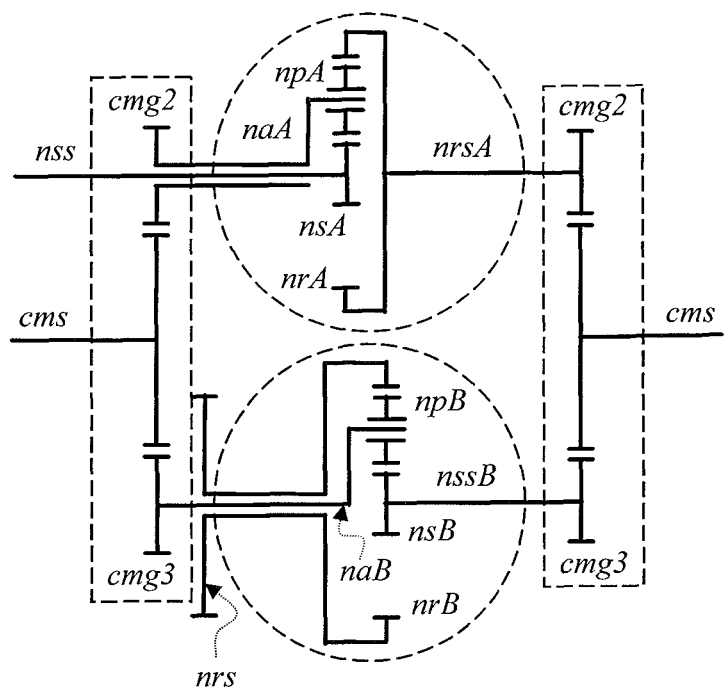
Figure 11:
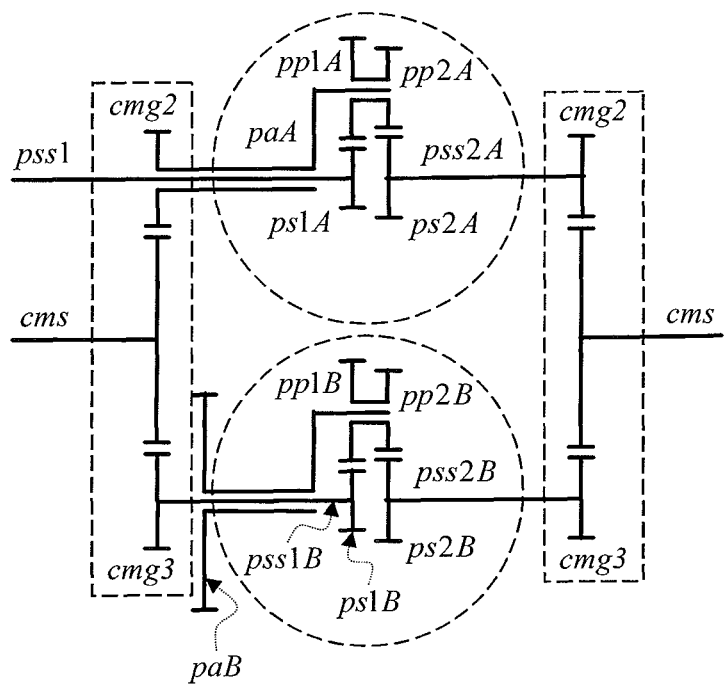
Figure 12:
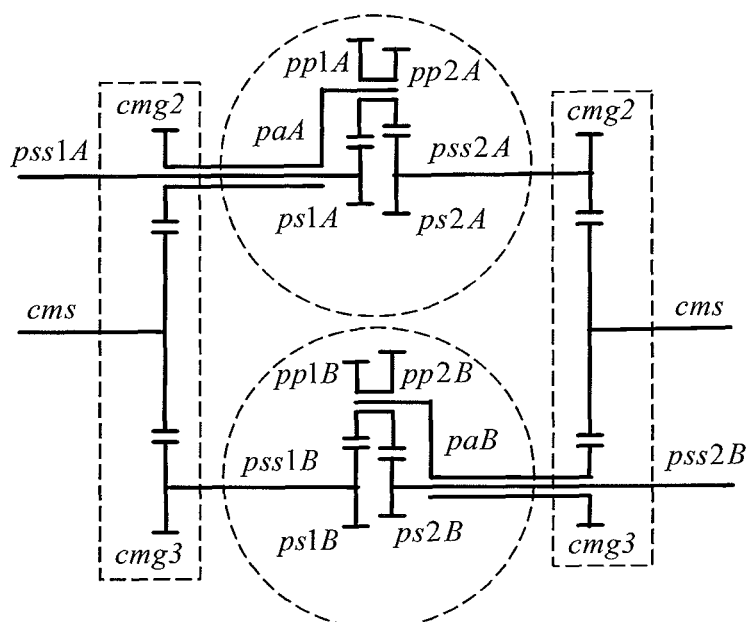
Figure 13:
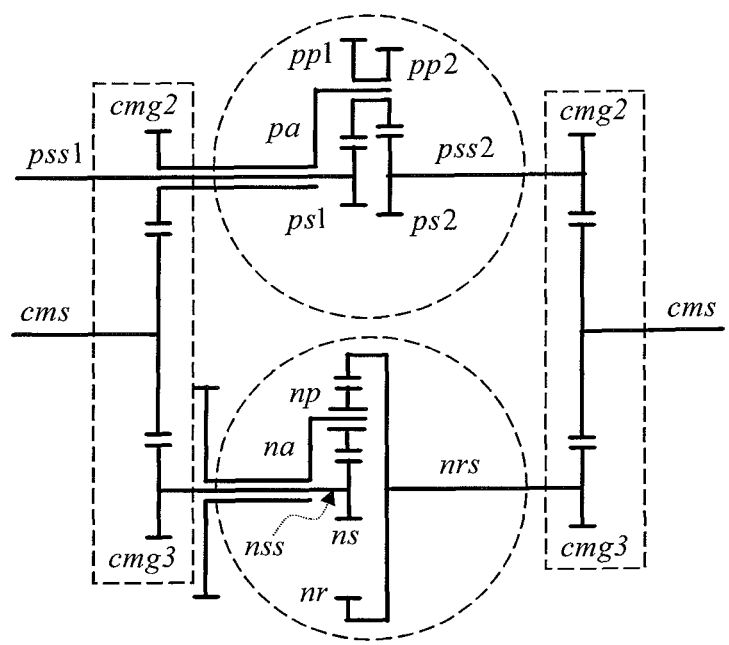
Figure 14:
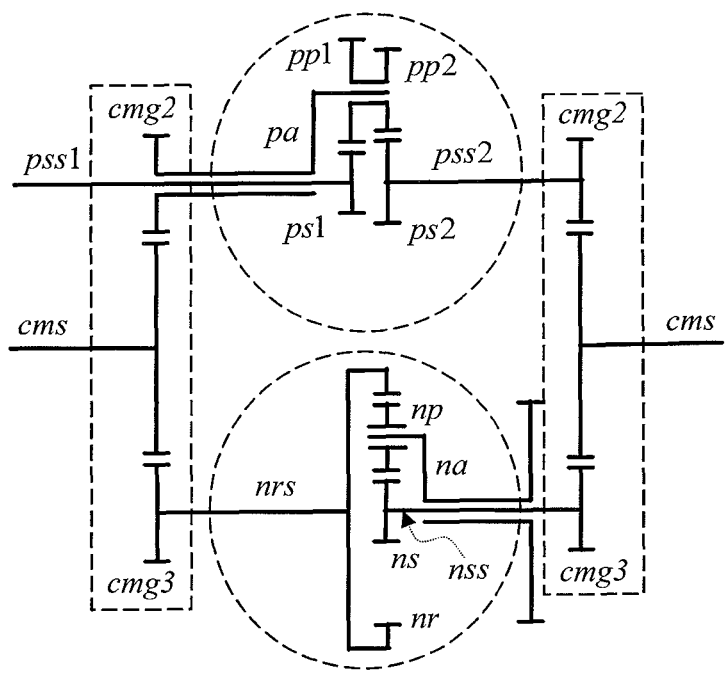
Figure 15:
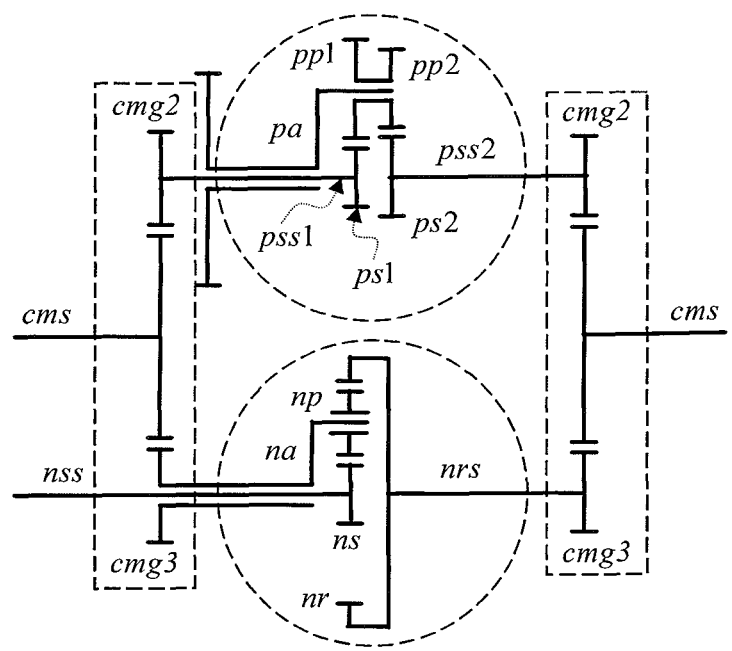
Figure 16:
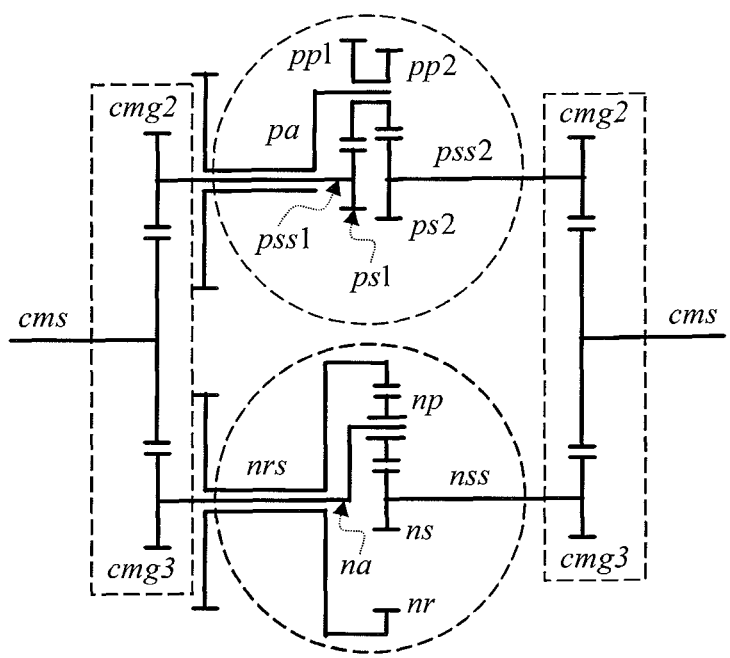
Figure 17:
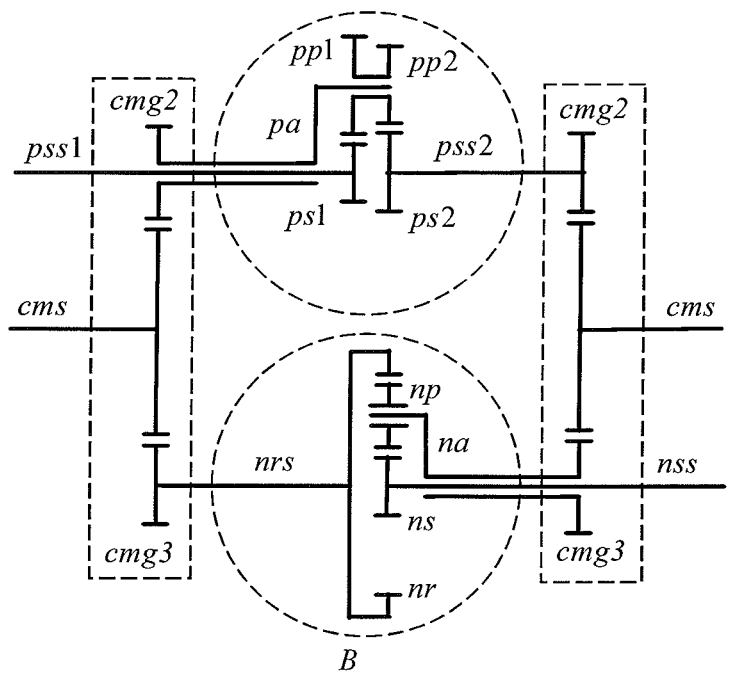
Figure 18:
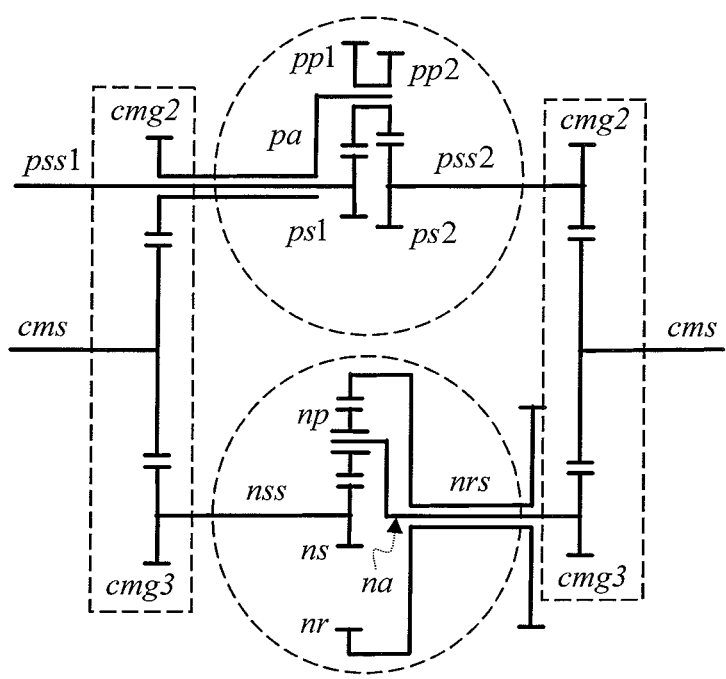
Figure 19:
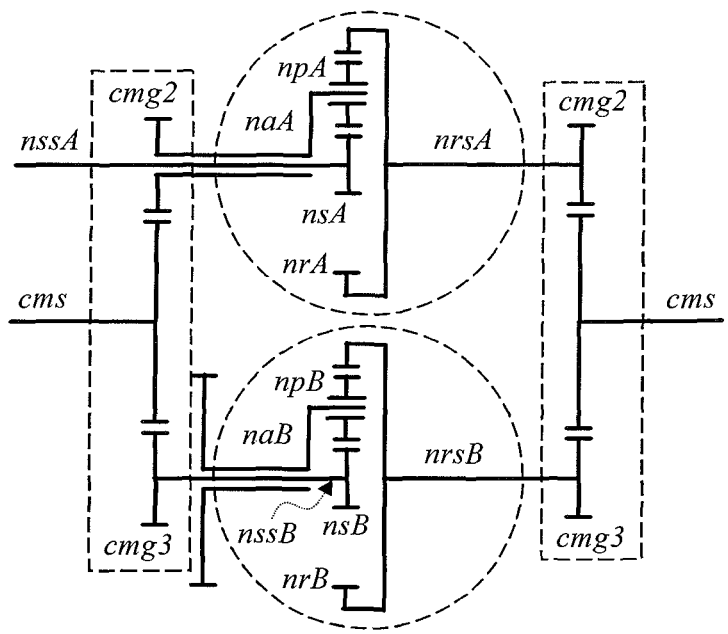
Figure 20:
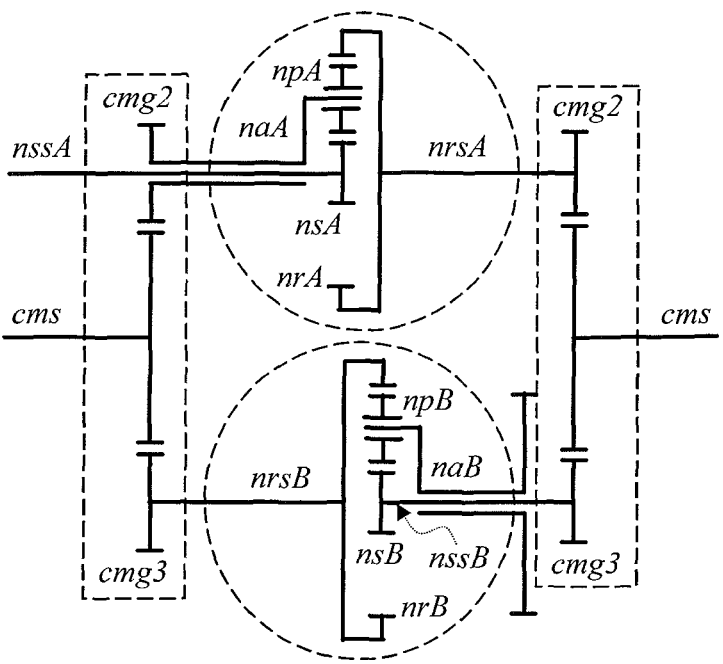
Figure 21:
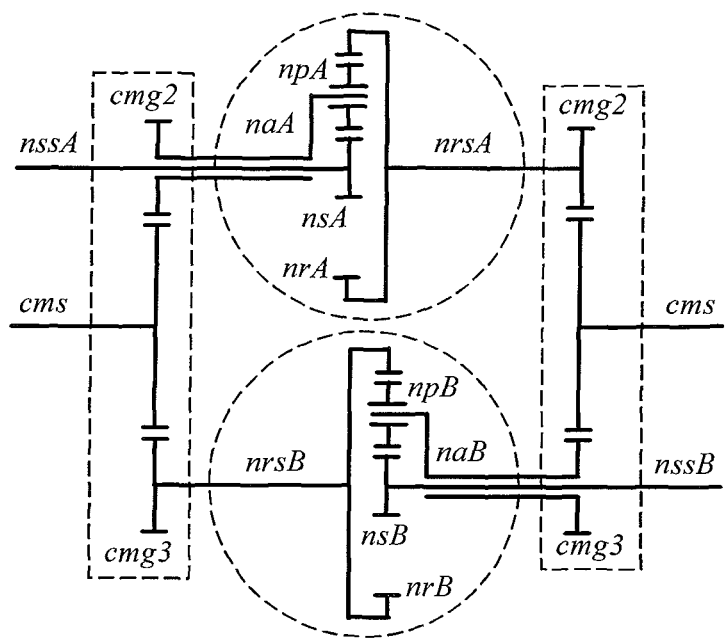
Figure 22:
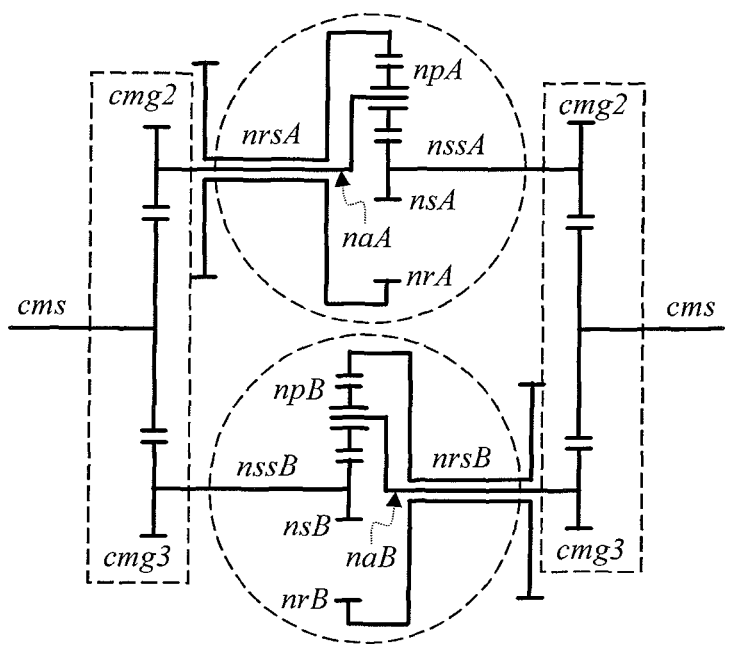
Figure 23:
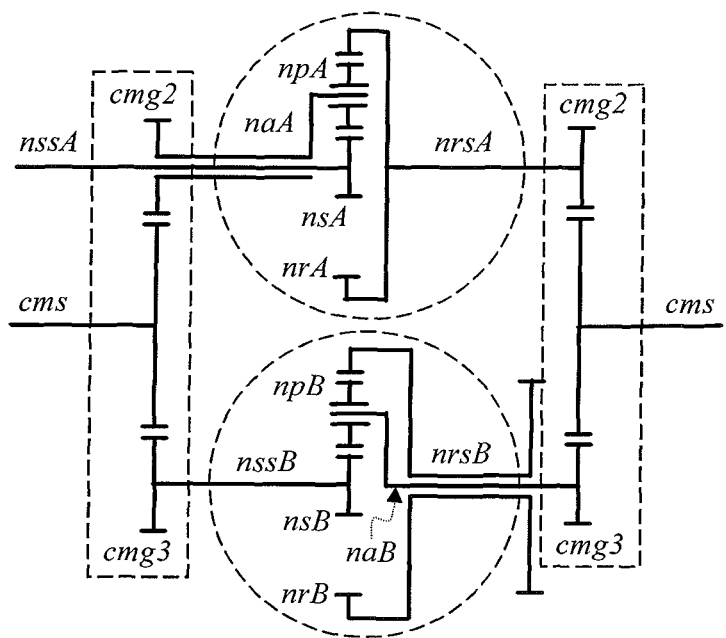
Figure 24:
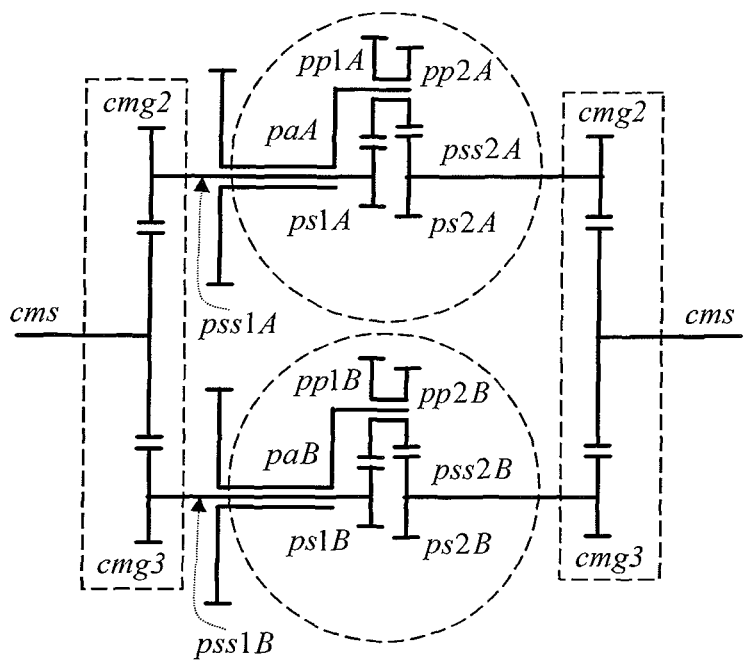
Figure 25:
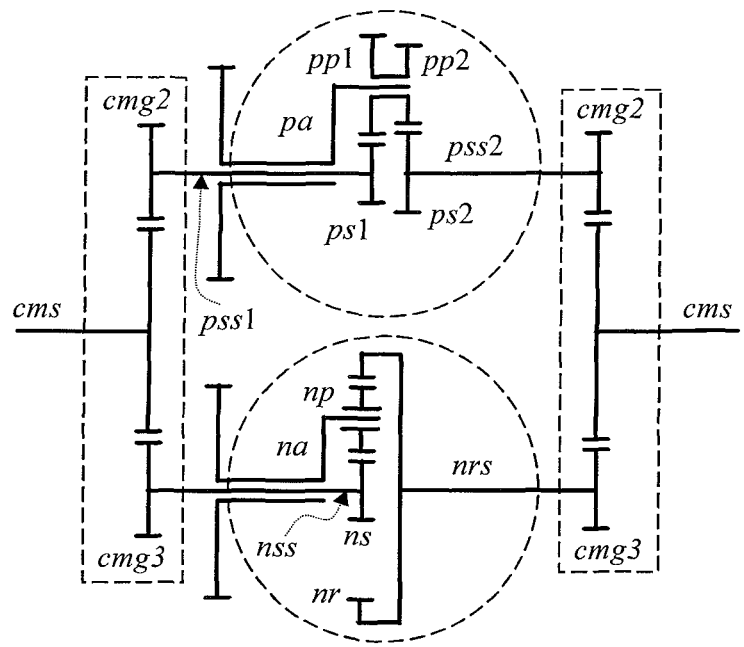
Figure 26:
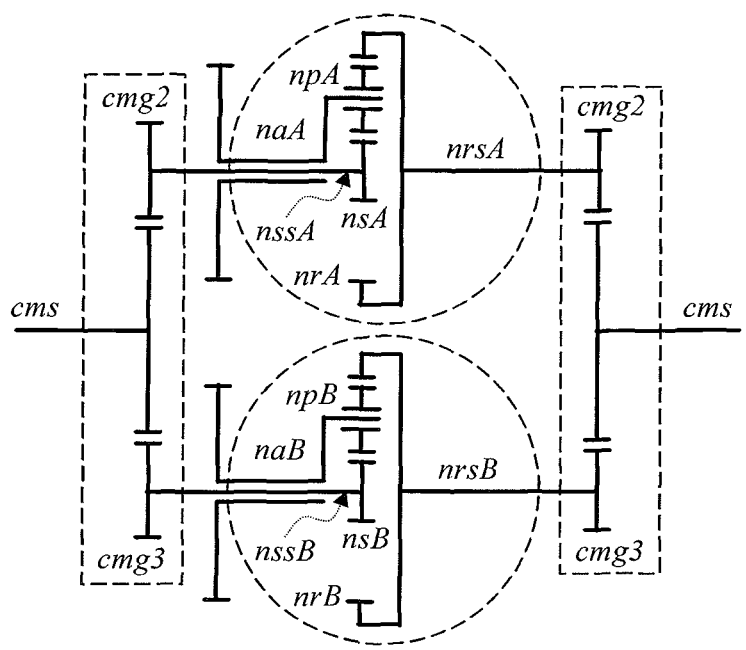
Figure 27:
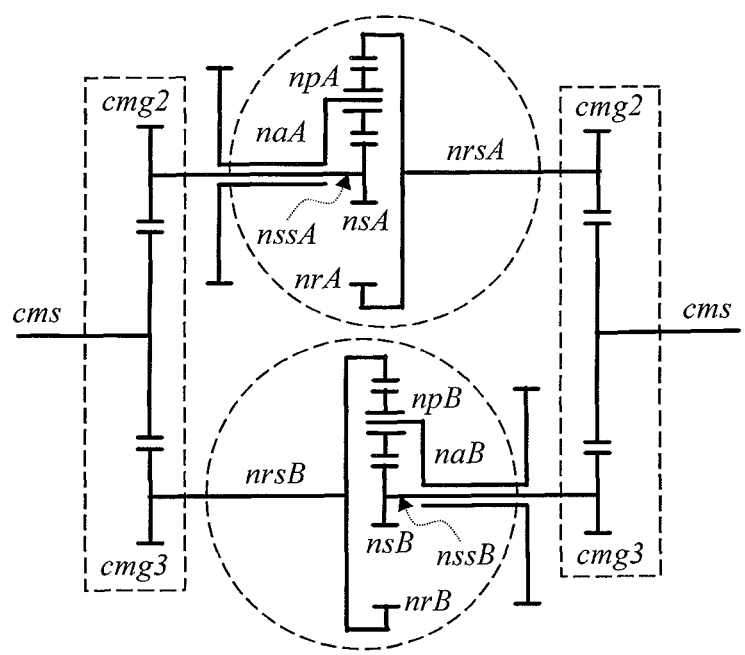

FIGS. 3A through 3C illustrate the planetary gear sets applied in the independently controllable transmission mechanism in accordance with the preferred embodiment of the present invention, Three examples of internal configurations of the planetary gear sets are shown in FIGS. 3A through 3C, which are not limitative of the present invention.

Turning now to FIG. 3A, the first example of the planetary gear set includes a sun gear identified as ps1, a sun-gear rotational axle identified as pss1, a central gear identified as ps2, a central-gear rotational axle identified as pss2, at least one compound planetary gear set formed with a first planetary gear identified as pp1 and a second planetary gear identified as pp2, and a planetary-gear-aim rotational axle identified as pa. The first planetary gear identified as pp1 and the second planetary gear identified as pp2 are correspondingly engaged with the sun gear ps1 and the central gear ps2. The sun-gear rotational axle pss1 and the planetary-gear-arm rotational axle pa are in perfect alignment with each other and coaxial. When the planetary-gear-arm rotational axle pa is fixed, the sun-gear rotational axle pss1 and the central-gear rotational axle pss2 have the same rotational directions and a positive ratio of rotational speeds. As is explained above, the planetary gear set is selected from a planetary gear set with a positive speed ratio.

Referring again to FIGS. 2 and 3A, the sun-gear rotational axle pss1, the central-gear rotational axle pss2 and the planetary-gear-arm rotational axle pa can perform as the first rotational axle OP, the second rotational axle AD and the third rotational axle AE of the first planetary gear set 1. Alternatively, the sun-gear rotational axle pss1, the central-gear rotational axle pss2 and the planetary-gear-arm rotational axle pa can perform as the first rotational axle CR, the second rotational axle BD and the third rotational axle BE of the second planetary gear set 2.

Turning now to FIGS. 3B and 3C, the illustrated planetary gear set includes a sun gear identified as ns, a sun-gear rotational axle identified as nss, a ring gear identified as nr, a ring-gear rotational axle identified as nrs, at least one planetary gear identified as np and a planetary-gear-arm rotational axle identified as na. The two illustrated planetary gear sets are different types of the planetary gear sets having a negative speed ratio.

Referring again to FIG. 3B, in the second example of the planetary gear set, the sun-gear rotational axle nss and the planetary-gear-arm rotational axle na are in perfect alignment with each other and coaxial. When the planetary-gear-arm rotational axle na is fixed, the sun-gear rotational axle nss and the ring-gear rotational axle nrs are rotated in reverse directions and have a negative ratio of rotational speeds.

Referring again to FIG. 3C, in the third example of the planetary gear set, the ring-gear rotational axle nrs and the planetary-gear-arm rotational axle na are in perfect alignment with each other and coaxial. When the planetary-gear-arm rotational axle na is fixed, the sun-gear rotational axle nss and the ring-gear rotational axle nrs are rotated in reverse directions and have a negative ratio of rotational speeds.

Referring again to FIGS. 2, 3B and 3C, the sun-gear rotational axle nss, the ring-gear rotational axle nrs and the planetary-gear-arm rotational axle na can perform as the first rotational axle OP, the second rotational axle AD and the third rotational axle AE of the first planetary gear set 1. Alternatively, the sun-gear rotational axle nss, the ring-gear rotational axle nrs and the planetary-gear-arm rotational axle na can perform as the first rotational axle CR, the second rotational axle BD and the third rotational axle BE of the second planetary gear set 2.

FIGS. 4A through 4F illustrate the transmission-connecting sets applied in the independently controllable transmission mechanism in accordance with the preferred embodiment of the present invention. Six examples of internal configurations of the transmission-connecting sets are shown in FIGS. 4A through 4F, which are not limitative of the present invention.

Turning now to FIGS. 4A-4F, the illustrated transmission-connecting set includes a first gear identified as cmg1, a rotational axle identified as cms, a second gear identified as cmg2 and a third gear identified as cmg3. The first gear cmg1 is engaged with the second gear cmg2 and the third gear cmg3, and may be formed from a single rotational axle, an outer axle or an inner axle of a coaxial mechanism.

Referring again to FIG. 4A, in the first example of the transmission-connecting set, each of the second gear cmg2 and the third gear cmg3 is formed from a single rotational axle. Referring again to FIG. 4B, in the second example of the transmission-connecting set, the second gear cmg2 is formed from an outer axle of a coaxial mechanism, while the third gear cmg3 is formed from a single rotational axle. Referring again to FIG. 4C, in the third example of the transmission-connecting set, the second gear cmg2 is formed from a single rotational axl, while the third gear cmg3 is formed from an inner axle of a coaxial mechanism. Referring again to FIG. 4D, in the fourth example of the transmission-connecting set, each of the second gear cmg2 and the third gear cmg3 is formed from an outer axle of a coaxial mechanism. Referring again to FIG. 4E, in the fifth example of the transmission-connecting set, the second gear cmg2 is formed from an outer axle of a coaxial mechanism, while the third gear cmg3 is formed from an inner axle of a coaxial mechanism. Referring again to FIG. 4F, in the sixth example of the transmission-connecting set, each of the second gear cmg2 and the third gear cmg3 is formed from an inner axle of a coaxial mechanism.

Referring again to FIGS. 2 and 4A through 4F, the rotational axle cms of the transmission-connecting set can be controlled to function as the first power input end SD of the first transmission-connecting set 3 or the free transmission end SE of the second transmission-connecting set 4. The second gear cmg2 and the third gear cmg3 of the transmission-connecting set mechanically connect with the second rotational axle AD of the first planetary gear set 1 and the second rotational axle BD of the second planetary gear set 2. Furthermore, the second gear cmg2 and the third gear cmg3 of the transmission-connecting set mechanically connect with the third rotational axle AE of the first planetary gear set 1 and the third rotational axle BE of the second planetary gear set 2.

Still referring again to FIG. 2, the relation between the speeds of the second rotational axle AD of the first planetary gear set 1 and the second rotational axle BD of the second planetary gear set 2 in accordance with the present invention are given:

$$n_{BD} = \alpha n_{AD}$$

where $n_{BD}$ and $n_{AD}$ are speeds of the second rotational axle BD of the second planetary gear set 2 and the second rotational axle AD of the first planetary gear set 1.

Furthermore, the relation between the speeds of the first rotational axle OP of the first planetary gear set 1 (i.e. first power output end) and the first rotational axle CR of the second planetary gear set 2 (i.e. transmission control end) in accordance with the present invention are given:

$$n_{CR} = \beta n_{OP}$$

where $n_{CR}$ and $n_{OP}$ are speeds of the first rotational axle CR of the second planetary gear set 2 (i.e. transmission control end) and the first rotational axle OP of the first planetary gear set 1 (i.e. first power output end).

Furthermore, the relation between the speeds of the third rotational axle AE of the first planetary gear set 1 and the third rotational axle BE of the second planetary gear set 2 in accordance with the present invention are given:

$$n_{AE} = n_{BE}$$

where $n_{AE}$ and $n_{BE}$ are speeds of the third rotational axle AE of the first planetary gear set 1 and the third rotational axle BE of the second planetary gear set 2.

FIGS. 5 through 27 illustrate several combinations of two planetary gear sets and two transmission-connecting sets formed in the independently controllable transmission mechanism in accordance with a first through twenty-third embodiments of the present invention. Twenty three embodiments of the transmission mechanisms are shown in FIGS. 5 through 27, which are not limitative of the present invention. Turning now to FIGS. 5 through 27, the transmission mechanism includes two planetary gear sets (dotted lines in two circles, which correspond to FIGS. 3A-3C) and two transmission-connecting sets (dotted lines in two rectangles, which correspond to FIGS. 4A-4F). As has been described in FIGS. 3A-3C and 4A-4F, the detailed configurations of the planetary gear sets and the transmission-connecting sets in FIGS. 5 through 27 will not be described for the sake of clarity.

Referring again to FIGS. 2 and 5, in the first embodiment, the two planetary gear sets correspond to the first planetary gear set 1 and the second planetary gear set 2 and are comprised of two planetary gear sets each of which has a positive speed ratio. The two transmission-connecting sets correspond to the first transmission-connecting set 3 and the second transmission-connecting set 4. Two planetary-gear-arm rotational axles paA, paB and two central-gear rotational axles pss2A, pss2B of the two planetary gear sets mechanically connect with the two transmission-connecting sets. Two sun-gear rotational axles pss1 of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 6, in the second embodiment, the two planetary gear sets correspond to the first planetary gear set 1 and the second planetary gear set and are comprised of a planetary gear set having a positive speed ratio and a planetary gear set having a negative speed ratio. The two transmission-connecting sets correspond to the first transmission-connecting set 3 and the second transmission-connecting set 4. Two planetary-gear-arm rotational axles pa, na, a central-gear rotational axle pss2 and a ring-gear rotational axle nrs of the two planetary gear sets mechanically connect with the two transmission-connecting sets. Two sun-gear rotational axles pss1, nss of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end. SE of the second transmission-connecting set 4.

Referring again to FIGS. 2 and 7, in the third embodiment, the two planetary gear sets correspond to the first planetary gear set 1 and the second planetary gear set and are comprised of a planetary gear set having a positive speed ratio and a planetary gear set having a negative speed ratio. The two transmission-connecting sets correspond to the first transmission-connecting set 3 and the second transmission-connecting set 4. Two planetary-gear-arm rotational axles pa, na and two sun-gear rotational axles pss1, nss of the two planetary gear sets mechanically connect with the two transmission-connecting sets. A central-gear rotational axle pss2 and a ring-gear rotational axle nrs of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 8, in the fourth embodiment, the two planetary gear sets correspond to the first planetary gear set 1 and the second planetary gear set 2 and are comprised of the same type of two planetary gear sets each of which has a negative speed ratio. The two transmission-connecting sets correspond to the first transmission-connecting set 3 and the second transmission-connecting set 4. Two planetary-gear-arm rotational axles naA, naB and two ring-gear rotational axles nrsA, nrsB of the two planetary gear sets mechanically connect with the two transmission-connecting sets. Two sun-gear rotational axles nss of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 9, in the fifth embodiment, the two planetary gear sets correspond to the first planetary gear set 1 and the second planetary gear set 2 and are comprised of the same type of two planetary gear sets each of which has a negative speed ratio. The two transmission-connecting sets correspond to the first transmission-connecting set 3 and the second transmission-connecting set 4. Two planetary-gear-arm rotational axles naA, naB and two sun-gear rotational axles nssA, nssB of the two planetary gear sets mechanically connect with the two transmission-connecting sets. Two ring-gear rotational axles cms of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 10, in the sixth embodiment, the two planetary gear sets correspond to the first planetary gear set 1 and the second planetary gear set 2 and are comprised of two different types of planetary gear sets each of which has a negative speed ratio. The two transmission-connecting sets correspond to the first transmission-connecting set 3 and the second transmission-connecting set 4. Two planetary-gear-arm rotational axles naA, naB, a ring-gear rotational axle nrsA and a sun-gear rotational axle nssB of the two planetary gear sets mechanically connect with the two transmission-connecting sets. A sun-gear rotational axle nss and a ring-gear rotational axle nrs of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 11, in the seventh embodiment, the two planetary gear sets correspond to the first planetary gear set 1 and the second planetary gear set 2 and are comprised of two planetary gear sets each of which has a positive speed ratio. The two transmission-connecting sets correspond to the first transmission-connecting set 3 and the second transmission-connecting set 4. A planetary-gear-arm rotational axle paA, a sun-gear rotational axle pss1B, and two central-gear rotational axles pss2A, pss2B of the two planetary gear sets mechanically connect with the two transmission-connecting sets. A sun-gear rotational axles pss1 and a planetary-gear-arm rotational axle paB of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 12, in the eighth embodiment, the two planetary gear sets correspond to the first planetary gear set 1 and the second planetary gear set and are comprised of two planetary gear sets each of which has a positive speed ratio. The two transmission-connecting sets correspond to the first transmission-connecting set 3 and the second transmission-connecting set 4. A planetary-gear-arm rotational axle paA, a sun-gear rotational axle pss1B, a central-gear rotational axle pss2A and a planetary-gear-arm rotational axle paB of the two planetary gear sets mechanically connect with the two transmission-connecting sets. A sun-gear rotational axles pss1A and a central-gear rotational axle pss2B of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 13, in the ninth embodiment, the two planetary gear sets correspond to the first planetary gear set 1 and the second planetary gear set 2 and are comprised of a planetary gear set having a positive speed ratio and a planetary gear set having a negative speed ratio. The two transmission-connecting sets correspond to the first transmission-connecting set 3 and the second transmission-connecting set 4. A planetary-gear-arm rotational axle pa, a sun-gear rotational axle nss, a central-gear rotational axle pss2 and a ring-gear rotational axle nrs of the two planetary gear sets mechanically connect with the two transmission-connecting sets. A sun-gear rotational axle pss1 and a planetary-gear-arm rotational axle na of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 14, in the tenth embodiment, the two planetary gear sets correspond to the first planetary gear set 1 and the second planetary gear set and are comprised of a planetary gear set having a positive speed ratio and a planetary gear set having a negative speed ratio. The two transmission-connecting sets correspond to the first transmission-connecting set 3 and the second transmission-connecting set 4. A planetary-gear-arm rotational axle pa, a ring-gear rotational axle nrs, a central-gear rotational axle pss2 and a sun-gear rotational axle nss of the two planetary gear sets mechanically connect with the two transmission-connecting sets. A sun-gear rotational axle pss1 and a planetary-gear-arm rotational axle na of the two planetary gear sets performed perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 15, in the eleventh embodiment, the two planetary gear sets correspond to the first planetary gear set 1 and the second planetary gear set 2 and are comprised of a planetary gear set having a positive speed ratio and a planetary gear set having a negative speed ratio. The two transmission-connecting sets correspond to the first transmission-connecting set 3 and the second transmission-connecting set 4. A sun-gear rotational axle pss1, a planetary-gear-arm rotational axle na, a central-gear rotational axle pss2 and a ring-gear rotational axle nrs of the two planetary gear sets mechanically connect with the two transmission-connecting sets. A planetary-gear-arm rotational axle pa and a sun-gear rotational axle nss of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 16, in the twelfth embodiment, the two planetary gear sets correspond to the first planetary gear set 1 and the second planetary gear set and are comprised of a planetary gear set having a positive speed ratio and a planetary gear set having a negative speed ratio. The two transmission-connecting sets correspond to the first transmission-connecting set 3 and the second transmission-connecting set 4. A sun-gear rotational axle pss1, a planetary-gear-arm rotational axle na, a central-gear rotational axle pss2 and a sun-gear rotational axle nss of the two planetary gear sets mechanically connect with the two transmission-connecting sets. A planetary-gear-arm rotational axle pa and a ring-gear rotational axle nrs of the two planetary gear sets performed perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 17, in the thirteenth embodiment, the two planetary gear sets correspond to the first planetary gear set 1 and the second planetary gear set 2 and are comprised of a planetary gear set having a positive speed ratio and a planetary gear set having a negative speed ratio. The two transmission-connecting sets correspond to the first transmission-connecting set 3 and the second transmission-connecting set 4. A planetary-gear-arm rotational axle pa, a ring-gear rotational axle nrs, a central-gear rotational axle pss2 and a planetary-gear-arm rotational axle na of the two planetary gear sets mechanically connect with the two transmission-connecting sets. Two sun-gear rotational axles pss1, nss of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 18, in the fourteenth embodiment, the two planetary gear sets correspond to the first planetary gear set 1 and the second planetary gear set 2 and are comprised of a planetary gear set having a positive speed ratio and a planetary gear set having a negative speed ratio. The two transmission-connecting sets correspond to the first transmission-connecting set 3 and the second transmission-connecting set 4. A planetary-gear-arm rotational axle pa, a sun-gear rotational axle nss, a central-gear rotational axle pss2 and a planetary-gear-arm rotational axle na of the two planetary gear sets mechanically connect with the two transmission-connecting sets. A sun-gear rotational axle pss1 and a ring-gear rotational axle nrs of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 19, in the fifteenth embodiment, the two planetary gear sets correspond to the first planetary gear set 1 and the second planetary gear set 2 and are comprised of the same type of two planetary gear sets each of which has a negative speed ratio. The two transmission-connecting sets correspond to the first transmission-connecting set 3 and the second transmission-connecting set 4. A planetary-gear-arm rotational axle naA, a sun-gear rotational axle nssB and two ring-gear rotational axles nrsA, nrsB of the two planetary gear sets mechanically connect with the two transmission-connecting sets. A sun-gear rotational axle nssA and a planetary-gear-arm rotational axle naB of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 20, in the sixteenth embodiment, the two planetary gear sets correspond to the first planetary gear set I and the second planetary gear set 2 and are comprised of the same type of two planetary gear sets each of which has a negative speed ratio. The two transmission-connecting sets correspond to the first transmission-connecting set 3 and the second transmission-connecting set 4. A planetary-gear-arm rotational axle naA, two ring-gear rotational axles nrsA, nrsB and a sun-gear rotational axle nssB of the two planetary gear sets mechanically connect with the two transmission-connecting sets. A sun-gear rotational axle nssA and a planetary-gear-arm rotational axle naB of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 21, in the seventeenth embodiment, the two planetary gear sets correspond to the first planetary gear set 1 and the second planetary gear set 2 and are comprised of the same type of two planetary gear sets each of which has a negative speed ratio. The two transmission-connecting sets correspond to the first transmission-connecting set 3 and the second transmission-connecting set 4. Two planetary-gear-arm rotational axles naA, naB and two ring-gear rotational axles nrsA, nrsB of the two planetary gear sets mechanically connect with the two transmission-connecting sets. Two sun-gear rotational axles nssA, nssB of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 22, in the eighteenth embodiment, the two planetary gear sets correspond to the first planetary gear set 1 and the second planetary gear set and are comprised of the same type of two planetary gear sets each of which has a negative speed ratio. The two transmission-connecting sets correspond to the first transmission-connecting set 3 and the second transmission-connecting set 4. Two planetary-gear-arm rotational axles naA, naB and two sun-gear rotational axles nssA, nssB of the two planetary gear sets mechanically connect with the two transmission-connecting sets. Two ring-gear rotational axles nrsA, nrsB of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 23, in the nineteenth embodiment, the two planetary gear sets correspond to the first planetary gear set 1 and the second planetary gear set 2 and are comprised of two different types of planetary gear sets each of which has a negative speed ratio. The two transmission-connecting sets correspond to the first transmission-connecting set 3 and the second transmission-connecting set 4. Two planetary-gear-arm rotational axles naA, naB, a ring-gear rotational axle nrsA and a sun-gear rotational axle nssB of the two planetary gear sets mechanically connect with the two transmission-connecting sets. A sun-gear rotational axle nssA and a ring-gear rotational axle nrsB of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 24, in the twentieth embodiment, the two planetary gear sets correspond to the first planetary gear set 1 and the second planetary gear set 2 and are comprised of two planetary gear sets each of which has a positive speed ratio. The two transmission-connecting sets correspond to the first transmission-connecting set 3 and the second transmission-connecting set 4. Two sun-gear rotational axles pss1A, pss1B and two central-gear rotational axles pss2A, pss2B of the two planetary gear sets mechanically connect with the two transmission-connecting sets. Two planetary-gear-arm rotational axles paA, paB of the two planetary gear sets perform as the first power output end of the first planetary gear set 1 (i.e. first rotational axle OP) and the transmission control end of the second planetary gear set 2 (ie. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 25, in the twenty-first embodiment, the two planetary gear sets correspond to the first planetary gear set 1 and the second planetary gear set 2 and are comprised of a planetary gear set having a positive speed ratio and a planetary gear set having a negative speed ratio. The two transmission-connecting sets correspond to the first transmission-connecting set 3 and the second transmission-connecting set 4. Two sun-gear rotational axles pss1, nss, a central-gear rotational axle pss2 and a ring-gear rotational axle nrs of the two planetary gear sets mechanically connect with the two transmission-connecting sets. Two planetary-gear-arm rotational axles pa, na of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 26, in the twenty-second embodiment, the two planetary gear sets correspond to the first planetary gear set 1 and the second planetary gear set 2 and are comprised of the same type of two planetary gear sets each of which has a negative speed ratio. The two transmission-connecting sets correspond to the first transmission-connecting set 3 and the second transmission-connecting set 4. Two sun-gear rotational axles nssA, nssB and two ring-gear rotational axles nrsA, nrsB of the two planetary gear sets mechanically connect with the two transmission-connecting sets. Two planetary-gear-arm rotational axles naA, naB of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Referring again to FIGS. 2 and 27, in the twenty-third embodiment, the two planetary gear sets correspond to the first planetary gear set 1 and the second planetary gear set 2 and are comprised of the same type of two planetary gear sets each of which has a negative speed ratio. The two transmission-connecting sets correspond to the first transmission-connecting set 3 and the second transmission-connecting set 4. Two sun-gear rotational axles nssA, nssB and two ring-gear rotational axles nrsA, nrsB of the two planetary gear sets mechanically connect with the two transmission-connecting sets. Two planetary-gear-arm rotational axles naA, naB of the two planetary gear sets perform as the first power output end of the first planetary gear set 1 (i.e. first rotational axle OP) and the transmission control end of the second planetary gear set 2 (i.e. first rotational axle CR). Two rotational axles cms of the two transmission-connecting sets perform as the first power input end SD of the first transmission-connecting set 3 and the free transmission end SE of the second transmission-connecting set 4.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. An independently controllable transmission mechanism comprising:
    a first planetary gear set including a first power output end;
    a second planetary gear set including a transmission control end;
    a first transmission-connecting set including a first power input end; and
    a second transmission-connecting set including a free transmission end;
    wherein the transmission control end controls the free transmission end to function as a second power input end or a second power output end.

2. The independently controllable transmission mechanism as defined in claim 1, wherein each of the first planetary gear set and the second planetary gear set has a positive speed ratio.

3. The independently controllable transmission mechanism as defined in claim 1, wherein the first planetary gear set has a positive speed ratio and the second planetary gear set has a negative speed ratio; or, the first planetary gear set has a negative speed ratio and the second planetary gear set has a positive speed ratio.

4. The independently controllable transmission mechanism as defined in claim 1, wherein each of the first planetary gear set and the second planetary gear set has a negative speed ratio.

5. The independently controllable transmission mechanism as defined in claim 4, wherein the first planetary gear set and the second planetary gear set are selected from a same type of negative-speed-ratio planetary gear sets; or, the first planetary gear set and the second planetary gear set are selected from different types of negative-speed-ratio planetary gear sets.

6. The independently controllable transmission mechanism as defined in claim 1, wherein the first planetary gear set includes a first rotational axle, a second rotational axle and a third rotational axle; the first rotational axle of the first planetary gear set performs as the first power output end; the second rotational axle of the first planetary gear set is connected with the first transmission-connecting set; and the third rotational axle of the first planetary gear set is connected with the second transmission-connecting set; and
    wherein the second planetary gear set includes a first rotational axle, a second rotational axle and a third rotational axle; the first rotational axle of the second planetary gear set performs as the transmission control end; the second rotational axle of the second planetary gear set is connected with the first transmission-connecting set; the third rotational axle of the second planetary gear set is connected with the second transmission-connecting set.

7. An independently controllable transmission mechanism comprising:
    at least two planetary gear sets, a first of the planetary gear sets including a first power output end and a second of the planetary gear sets including a transmission control end; and
    at least two transmission-connecting sets, a first of the transmission-connecting sets including a first power input end and a second of the transmission-connecting sets including a free transmission end;
    wherein the transmission control end controls the free transmission end to function as a second power input end or a second power output end.

8. The independently controllable transmission mechanism as defined in claim 7, wherein each of the first and the second of the planetary gear sets has a positive speed ratio.

9. The independently controllable transmission mechanism as defined in claim 8, wherein the planetary gear set, having a positive speed ratio, includes a sun gear, a sun-gear rotational axle, a central gear, a central-gear rotational axle, at least one compound planetary gear set formed with a first planetary gear, a second planetary gear, and a planetary-gear-arm rotational axle; the first planetary gear and the second planetary gear are engaged with the sun gear and the central gear.

10. The independently controllable transmission mechanism as defined in claim 7, wherein the first of the planetary gear sets has a positive speed ratio and the second of the planetary gear sets has a negative speed ratio; or, the first of the planetary gear sets has a negative speed ratio and the second of the planetary gear sets has a positive speed ratio.

11. The independently controllable transmission mechanism as defined in claim 10, wherein the planetary gear set, having a positive speed ratio, includes a sun gear, a sun-gear rotational axle, a central gear, a central-gear rotational axle, at least one compound planetary gear set formed with a first planetary gear, a second planetary gear, and a planetary-gear-arm rotational axle; the first planetary gear and the second planetary gear are engaged with the sun gear and the central gear.

12. The independently controllable transmission mechanism as defined in claim 10, wherein the planetary gear set, having a negative speed ratio, includes a sun gear, a sun-gear rotational axle, a ring gear, a ring-gear rotational axle, at least one planetary gear and a planetary-gear-arm rotational axle.

13. The independently controllable transmission mechanism as defined in claim 12, wherein the sun-gear rotational axle and the planetary-gear-arm rotational axle are in alignment with each other and coaxial; when the planetary-gear-arm rotational axle is fixed, the sun-gear rotational axle and the ring-gear rotational axle are rotated in reverse directions and have a negative ratio of rotational speeds.

14. The independently controllable transmission mechanism as defined in claim 12, wherein the ring-gear rotational axle and the planetary-gear-arm rotational axle are in alignment with each other and coaxial; when the planetary-gear-arm rotational axle is fixed, the sun-gear rotational axle and the ring-gear rotational axle are rotated in reverse directions and have a negative ratio of rotational speeds.

15. The independently controllable transmission mechanism as defined in claim 7, wherein each of the first and the second of the planetary gear sets has a negative speed ratio.

16. The independently controllable transmission mechanism as defined in claim 15, wherein the planetary gear set, having a negative speed ratio, includes a sun gear, a sun-gear rotational axle, a ring gear, a ring-gear rotational axle, at least one planetary gear and a planetary-gear-arm rotational axle.

17. The independently controllable transmission mechanism as defined in claim 16, wherein the sun-gear rotational axle and the planetary-gear-arm rotational axle are in alignment with each other and coaxial; when the planetary-gear-arm rotational axle is fixed, the sun-gear rotational axle and the ring-gear rotational axle are rotated in reverse directions and have a negative ratio of rotational speeds.

18. The independently controllable transmission mechanism as defined in claim 16, wherein the ring-gear rotational axle and the planetary-gear-arm rotational axle are in alignment with each other and coaxial; when the planetary-gear-arm rotational axle is fixed, the sun-gear rotational axle and the ring-gear rotational axle are rotated in reverse directions and have a negative ratio of rotational speeds.

19. The independently controllable transmission mechanism as defined in claim 15, wherein the first and the second of the planetary gear sets are selected from a same type of negative-speed-ratio planetary gear sets; or, the first and the second of the planetary gear sets are selected from different types of negative-speed-ratio planetary gear sets.

20. The independently controllable transmission mechanism as defined in claim 7, wherein the first planetary gear set includes a first rotational axle, a second rotational axle and a third rotational axle; the first rotational axle of the first planetary gear set performs as the first power output end; the second rotational axle of the first planetary gear set is connected with the first transmission-connecting set; and the third rotational axle of the first planetary gear set is connected with the second transmission-connecting set; and wherein the second planetary gear set includes a first rotational axle, a second rotational axle and a third rotational axle; the first rotational axle of the second planetary gear set performs as the transmission control end; the second rotational axle of the second planetary gear set is connected with the first transmission-connecting set; the third rotational axle of the second planetary gear set is connected with the second transmission-connecting set.

* * * * *